Patented Feb. 8, 1949

2,460,973

UNITED STATES PATENT OFFICE 2,460,973

LOW-TEMPERATURE, HYDROGEN FLUORIDE CATALYZED POLYMERIZATION OF CONJUGATED DIOLEFINS

John D. Calfee and John H. Pearson, Manhasset, N. Y., assignors to Allied Chemical & Dye Corporation, a corporation of New York No Drawing. Application June 21, 1946,
Serial No. 678,362

13 Claims. (Cl. 260—93)

This invention relates to the production of hydrocarbon polymers and more particularly to the production of linear hydrocarbon polymers substantially free of objectionable cross-linked material.

British Patent No. 500,769 of 1939 discloses polymerization of diolefins in the liquid phase, using anhydrous hydrogen halides as polymerization catalysts at temperatures below $-20°$ C., separating from the resulting polymerization product, constituents boiling without decomposition under pressure of 10 mm. of mercury gauge by distillation or treatment with selective solvents, and subjecting the residual polymerization product to a further polymerization by raising the temperature thereof to 100° to 200° C., to produce products which are stated to be useful as drying oils or rubber substitutes. In the examples of this British patent, hydrogen chloride is used as the polymerization catalyst; no other hydrogen halide is disclosed in this patent. The use of hydrogen fluoride as a catalyst for the polymerization of diolefins, under the conditions disclosed in this British patent, has been found to instantly polymerize the diolefins to a hard, brittle resin, having no appreciable elasticity or resiliency and unsuitable for use as drying oils or rubber substitutes.

Surprisingly, we have found that by polymerizing conjugated aliphatic diolefins at a temperature below 0° C., preferably within the range of $-20°$ to $-150°$ C., employing anhydrous hydrogen fluoride as the catalyst, in the presence of an inert halogenated aliphatic hydrocarbon solvent or diluent for the diolefins and the catalyst, linear polymers substantially free of cross-linked material are produced. The molecular weight of the polymers will depend upon the temperature of polymerization; the molecular weight is decreased by increasing the reaction temperature at which the polymer is formed. Operating at temperatures near the upper portion of the range, namely, near but below 0° C., viscous oils are produced suitable for use, for example, as drying oils or drying oil substitutes; on the other hand, when operating at temperatures below $-60°$ C., preferably below $-75°$ C., high molecular weight, rubber-like products are produced.

As the conjugated aliphatic diolefin polymerized butadiene-1,3; alkyl-substituted butadienes such as (1) 2-methyl butadiene-1,3, (2) 2,3-dimethyl butadiene-1,3, (3) 2,3-diethyl-1,3-butadiene, (4) 2-methyl-3-ethyl-1,3-butadiene; pentadiene-1,3; methyl pentadiene-1,3; cyclopentadiene or the like may be employed. By aliphatic diolefins is meant a diolefin free of aryl substituents. Butadiene-1,3 which is readily available in commercial quantities is preferred.

The solvents which may be employed in accordance with this invention are halogenated aliphatic hydrocarbons in which both the conjugated diolefin and anhydrous hydrogen fluoride are soluble, which is inert to the reactants and the desired polymer, and which remains liquid at the reaction temperature either because it has a freezing point below the reaction temperature, or forms a eutectic mixture with the diolefin, which mixture has a freezing point below the reaction temperature or for some other reason. Preferably but not necessarily the solvent has a boiling point not exceeding 25° C. Examples of such solvents are ethylidene fluoride, dichlorodifluoromethane, trichloromonofluoromethane and methyl chloride. Employing a solvent which boils below about $-25°$ C., for example, ethylidene fluoride or dichlorodifluoromethane, the reaction may be carried out without external cooling, when it is desired to produce viscous oils, the solvent acting as an internal refrigerant. Employing a solvent such as trichloromonofluoromethane which boils at 25° C., external refrigeration should be employed to maintain the reaction mixture at below 0° C.; also external refrigeration will be required when employing solvents boiling below $-60°$ C. in the production of rubber-like products which, as above indicated, result when the reaction temperature is maintained below $-60°$ C., preferably below $-75°$ C. The preferred solvents are fluoroaliphatic compounds having a boiling point not exceeding 25° C.; particularly preferred is ethylidene fluoride, chiefly because it has been found to be an excellent solvent for the reactants, particularly for hydrogen fluoride and butadiene-1,3 and unusually inert to the reactants and the desired polymer product.

The amount of hydrogen fluoride catalyst employed should be as small as possible. Not only is this in the interest of economy but low concentration of catalyst in the reaction mixture results in the production of the best products. From ½ to 5 parts by weight of hydrogen fluoride per 100 parts of conjugated diolefin reacted may be employed. In the polymerization of butadiene-1,3, from 2 to 5 parts by weight of hydrogen fluoride per 100 parts of butadiene have been found effective; the amount, however, as above indicated may be reduced to as low as ½ part of hydrogen fluoride per 100 parts of butadiene-1,3 or even lower.

In accordance with a preferred embodiment of the invention, a solution of anhydrous hydrogen fluoride in the inert solvent is added to the diolefin diluted with the solvent and cooled by external refrigeration to a temperature below 0° C., preferably below —20° C. A catalyst solution of a concentration of from .01 to 10% or higher by weight may be used; the preferred concentration is from about 1 to about 5% by weight. For best results, it is important to employ a catalyst solution of anhydrous hydrogen fluoride in the solvent of relatively low concentration, say of about 1 to about 5% by weight of catalyst; employing ethylidene fluoride as the solvent, a solution containing from about 1 to about 5% by weight of hydrogen fluoride has been found to give excellent results.

The dilution of the diolefin with the solvent to produce the reaction mixture to which the catalyst is added minimizes the formation of cross-linked material. The specific amount of solvent thus employed depends on the reaction temperature, concentration of diluent in the catalyst solution, the particular diolefin polymerized, etc. For economic reasons the concentration of the solution of diolefin in the solvent, to which the catalyst solution is added, should be as concentrated as possible. In general, from 2 to 6 volumes of solvent may be used per volume of diolefin. In the polymerization of butadiene employing ethylidene fluoride as the solvent, a solution of butadiene in ethylidene fluoride containing from 2 to 6 volumes of ethylidene fluoride per volume of butadiene has been found to give excellent results. By using the same diluent or solvent for the catalyst and the diolefin, recovery of the solvent is simplified.

In carrying out the process to produce solid rubber-like products, the catalyst solution, cooled below the boiling temperature of the solvent, is added slowly to a vigorously agitated mixture of diolefin and diluent cooled to below —60° C., preferably below —75° C. External refrigeration is applied to remove the evolved heat of polymerization and to keep the solution temperature from rising appreciably above —75° C. The addition of catalyst solution is discontinued when polymerization becomes rapid, as evidenced by formation of polymer slurry and the system is kept at low temperatures below —75° C., until polymerization ceases.

Upon formation of the polymer having the desired properties, the catalyst may be quenched by blowing ammonia into the reaction mixture, by the addition of some other base, by dumping the reaction mixture in water, by adding alcohol or acetone to the reaction mixture, or by heating the reaction mixture to flash-off the solvent or diluent. Alternatively, the diluent and excess diolefin may be removed from the polymer by filtration. An elastic rubber-like high molecular weight polymer, largely or completely soluble in hydrocarbon solvents such benzene, petroleum naphtha and other hydrocarbon solvents, indicating a predominantly linear structure, is obtained in this manner in high yields. This polymer may be chlorinated to produce a product similar to chlorinated rubber. It may be oxidized to produce a resin suitable for use as a protective coating or for molding purposes.

By following the above procedure but operating at higher temperature within the range of 0° to —25° C., viscous oils are produced, substantially completely soluble in benzene, petroleum naphtha and other hydrocarbon solvents, which, upon exposure in thin films to the action of air, dry to form clear, hard, tough, protective coatings, and are, therefore, suitable for use as drying oils or drying oil substitutes. Operating at temperatures from —25° to —60°, more viscous products are produced; thus viscous oils may be produced, operating within the range of 0° C. to —60° C. and rubber-like products operating within the range of —60° C. to —150° C.

The time required for carrying out the polymerization depends upon several factors, among which are the concentration of the conjugated diolefin in the solvent and in the reaction mixture, the concentration of hydrogen fluoride in the reaction mixture, the rate of addition of the hydrogen fluoride, the temperature employed, the extent of polymerization desired, the pressure at which the polymerization is conducted, which preferably is atmospheric but may be sub or super atmospheric, etc. It is preferred to carry out the polymerization under conditions such that the polymerization time ranges from ¾ of an hour to 2 hours.

The following specific examples are illustrative of the invention. It will be understood that the invention is not limited to these examples. All parts and percentages in these examples are by weight unless otherwise indicated.

*Example 1*

Liquid butadiene-1,3 and liquid ethylidene fluoride were mixed in the ratio of 32 parts of butadiene to 123.5 parts of ethylidene fluoride, and the mixture cooled to a temperature of —55° C. by a cooling coil disposed in the solution.

In a separate vessel the catalyst solution was prepared containing 11% of hydrogen fluoride in ethylidene fluoride and this solution kept at a temperature of —78° C.

The catalyst solution was added to the butadiene solution in small portions over about a 10-minute period to initiate reaction. The catalyst solution was then added over an additional 20-minute period. The total amount of hydrogen fluoride thus introduced was 1.6 parts. The heat of reaction brought the solution to the boiling point of the ethylidene fluoride (—25° C.) very quickly, and vigorous boiling took place so that no additional agitation was required. The reaction temperature throughout the reaction was maintained at —25° C. by the boiling ethylidene fluoride. At the end of the reaction period which lasted about an hour, ethyl alcohol was added to "quench" the catalyst and the reaction mixture poured into water to flash-off the ethylidene fluoride and unreacted butadiene. The polymerization product was dried in a vacuum oven at 50° C. A viscous oil in approximately 50% yield resulted; the oil was soluble in benzene and satisfactory for use as a drying oil.

*Example 2*

This procedure, in general, was the same as that of Example 1, except that 31 parts of butadiene-1,3 were mixed with 151 parts of ethylidene fluoride to produce the butadiene solution, to which a hydrogen fluoride solution containing 2.5% of hydrogen fluoride was added, until .67 part of hydrogen fluoride was incorporated in the butadiene solution. The initial temperature of the catalyst solution was —58° C.; the temperature maintained during the reaction by the boiling ethylidene fluoride was —25° C. A viscous oil suitable for use as a drying oil in 77% yield was thus obtained.

Example 3

To a solution consisting of 125 parts ethylidene fluoride and 31 parts of butadiene-1,3 was added a solution consisting of .25 part of anhydrous hydrogen fluoride dissolved in 11 parts of ethylidene fluoride. After this addition, which required 15 minutes, a second solution of catalyst containing .42 part of hydrogen fluoride in 15.5 parts of ethylidene fluoride was added. Polymerization was allowed to continue for one hour with the boiling ethylidene fluoride serving as both diluent and internal refrigerant, the polymerization being carried out at a temperature of —25° C. The catalyst was then "quenched" with large excess of acetone and the coagulated polymer separated from the liquid mixture of ethylidene fluoride, unreacted butadiene and acetone. A viscous oil, completely soluble in benzene, and suitable for use as a drying oil, in 77% yield was thus obtained.

Example 4

In this example, the polymerization was carried out in a metal vessel, cooled externally with a dry ice petroleum ether mixture. The vessel was provided with a mechanically operated stirrer. A solution of butadiene-1,3 in ethylidene fluoride containing 65 parts of butadiene and 223 parts of ethylidene fluoride was first cooled to a temperature of —78° C. in this reaction vessel and the solution of hydrogen fluoride in ethylidene fluoride then added in small amounts until polymer slurry was observed to form. Catalyst was added as required, to keep the reaction going at a rapid rate. The time for the addition of the catalyst was 20 minutes, and the amount of hydrogen fluoride introduced was 1.24 parts. The reaction was allowed to continue for about an hour before the catalyst was quenched and worked-up as described in connection with Example 1. The reaction temperature was —75° C. A high yield of a rubber-like material essentially free of cross-linked polymers, which material could be milled, compounded and vulcanized in the same manner as synthetic rubber, such as butadiene styrene copolymers, was thus obtained.

The above examples were repeated, using instead of butadiene-1,3, methyl pentadiene-1,3 and 2,3-dimethyl butadiene-1,3 with essentially the same results. Other conjugated aliphatic diolefins may be substituted for the butadiene-1,3 in the above examples.

Since certain changes may be made in carrying out the above process without departing from the scope of the invention, it is intended that all matter contained in the above description shall be interpreted as illustrative and not in a limiting sense.

What is claimed is:

1. The process of preparing hydrocarbon polymers comprising polymerizing a conjugated aliphatic diolefin at a temperature below 0° C., employing anhydrous hydrogen fluoride as the catalyst in the presence of a halogenated aliphatic hydrocarbon solvent for both the diolefin and the hydrogen fluoride, which solvent is inert to the reactants and to the resulting polymer.

2. The process of preparing hydrocarbon polymers comprising polymerizing a conjugated diolefin at a temperature within the range of —20° C. to —150° C., employing anhydrous hydrogen fluoride as the catalyst in the presence of a fluoroaliphatic hydrocarbon having a boiling point not exceeding 25° C., which fluoroaliphatic hydrocarbon is a solvent for both the diolefin and the hydrogen fluoride, and is inert to the reactants and to the resulting polymer.

3. The process of polymerizing butadiene-1,3 to produce linear polymers which comprises polymerizing butadiene-1,3 at a temperature below 0° C., employing anhydrous hydrogen fluoride as the catalyst in the presence of a halogenated aliphatic hydrocarbon solvent for both the butadiene and the hydrogen fluoride, which solvent is inert to the reactants and to the resulting polymer.

4. The process of polymerizing butadiene-1,3 to produce linear polymers which comprises polymerizing butadiene-1,3 at a temperature within the range of —20° to —150° C., employing anhydrous hydrogen fluoride as the catalyst in the presence of a halogenated aliphatic hydrocarbon having a boiling point not exceeding 25° C., which halogenated hydrocarbon is a solvent for both the butadiene and the hydrogen fluoride, and is inert to the reactants and to the resulting polymer.

5. The process of polymerizing butadiene-1,3 to produce a linear polymer substantially free of cross-linked material, which comprises polymerizing the butadiene-1,3 at a temperature below 0° C., employing anhydrous hydrogen fluoride as the catalyst in the presence of ethylidene fluoride solvent for both the butadiene-1,3 and the anhydrous hydrogen fluoride.

6. The process of polymerizing butadiene-1,3 to produce a linear polymer substantially free of cross-linked material, which comprises polymerizing the butadiene-1,3 at a temperature within the range of 0° C. to —150 C., employing anhydrous halogen fluoride as the catalyst in the presence of ethylidene fluoride solvent for both the butadiene-1,3 and the anhydrous hydrogen fluoride.

7. The process of polymerizing butadiene-1,3 to produce a viscous oil suitable for use as a drying oil which comprises polymerizing butadiene-1,3 at a temperature of from 0° to —60° C., employing anhydrous hydrogen fluoride as the catalyst in the presence of ethylidene fluoride solvent for both the butadiene-1,3 and the anhydrous hydrogen fluoride.

8. The process of polymerizing butadiene-1,3 to produce a rubber-like product which comprises polymerizing butadiene-1,3 at a temperature below —60° C., employing anhydrous hydrogen fluoride as the catalyst in the presence of ethylidene fluoride solvent for both the butadiene-3 and the anhydrous hydrogen fluoride.

9. The process of producing linear hydrocarbon polymers which comprises adding a solution of hydrogen fluoride catalyst in an inert halogenated aliphatic hydrocarbon solvent for the hydrogen fluoride to a solution of a conjugated aliphatic diolefin in an inert halogenated aliphatic hydrocarbon solvent for the diolefin while maintaining the temperature of the resulting mixture below 0° C. to polymerize said conjugated aliphatic diolefin to produce a linear hydrocarbon polymer.

10. The process of producing linear hydrocarbon polymers which comprises adding a solution of anhydrous hydrogen fluoride catalyst in an inert halogenated aliphatic hydrocarbon solvent, the said solution containing from .01 to 10% by weight of catalyst, to a concentrated solution of conjugated aliphatic diolefin in said solvent while maintaining the reaction temperature within the range of —20° C. to —150° C. to polymerize said conjugated aliphatic diolefin to produce a linear hydrocarbon polymer.

11. The process of producing linear hydrocarbon polymers which comprises adding an ethylidene fluoride solution of anhydrous hydrogen fluoride containing from .01 to 10% by weight of hydrogen fluoride to a solution of butadiene-1,3 in ethylidene fluoride while maintaining the reaction temperature within the range of $-20°$ C. to $-150°$ C. to polymerize said butadiene-1,3 to produce a linear hydrocarbon polymer.

12. The process of producing linear hydrocarbon polymers which comprises producing a solution of a conjugated aliphatic diolefin in a halogenated aliphatic hydrocarbon solvent therefor, adding to this solution a solution of anhydrous hydrogen fluoride in said solvent, continuing the addition of the hydrogen fluoride solution until the desired amount of hydrogen fluoride has been introduced into the diolefin solution to effect polymerization of the diolefin while maintaining the reaction mixture at a temperature below $0°$ C., and when a polymer of desired properties has been formed, quenching the reaction mixture and separating the unreacted diolefin and solvent from the resulting polymer.

13. The process of producing linear hydrocarbon polymers which comprises producing a solution of butadiene-1,3 in ethylidene fluoride, adding to this solution a solution of anhydrous hydrogen fluoride in ethylidene fluoride, continuing the addition of the hydrogen fluoride solution until the desired amount of hydrogen fluoride has been introduced into the butadiene solution to effect polymerization of the butadiene while maintaining the temperature of the reaction mixture within the range of from $-20°$ to $-150°$ C., and when a polymer of desired properties has been formed, quenching the reaction mixture and separating unreacted butadiene and the ethylidene fluoride from the resulting polymer.

JOHN D. CALFEE.
JOHN H. PEARSON.

REFERENCES CITED

The following references are of record in the file of this patent:

UNITED STATES PATENTS

| Number | Name | Date |
|---|---|---|
| 2,317,878 | Bannon | Apr. 27, 1943 |

FOREIGN PATENTS

| Number | Country | Date |
|---|---|---|
| 524,220 | Germany | Apr. 16, 1931 |

Certificate of Correction

Patent No. 2,460,973.　　　　　　　　　　　　　　　　February 8, 1949.

JOHN D. CALFEE ET AL.

It is hereby certified that errors appear in the printed specification of the above numbered patent requiring correction as follows:

Column 3, line 62, after the word "such" insert *as*; column 6, line 35, claim 6, for "0° C. to —150 C." read *0° C. to —150° C.*; lines 53 and 54, claim 8, for "butadiene-3" read *butadiene-1,3*;

and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*